United States Patent
Kim et al.

(10) Patent No.: US 9,634,512 B1
(45) Date of Patent: Apr. 25, 2017

(54) BATTERY BACKUP WITH BI-DIRECTIONAL CONVERTER

(71) Applicant: Google Inc., Mountain View, CA (US)

(72) Inventors: Sangsun Kim, San Jose, CA (US); Mark R. Imbertson, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 508 days.

(21) Appl. No.: 14/095,498

(22) Filed: Dec. 3, 2013

(51) Int. Cl.
*H02J 7/00* (2006.01)

(52) U.S. Cl.
CPC .................. *H02J 7/0072* (2013.01)

(58) Field of Classification Search
CPC ..................................... H02J 7/0072
USPC ............................................ 307/66
See application file for complete search history.

(56) References Cited

U.S. PATENT DOCUMENTS

| | | | |
|---|---|---|---|
| 6,188,199 B1 * | 2/2001 | Beutler | H02J 7/022 320/125 |
| 7,117,044 B2 | 10/2006 | Kocher | |
| 7,960,855 B2 * | 6/2011 | King | B60L 7/06 307/10.1 |
| 9,065,277 B1 | 6/2015 | Kim et al. | |
| 9,490,663 B1 | 11/2016 | Kim et al. | |
| 2013/0187468 A1 | 7/2013 | Kim et al. | |

FOREIGN PATENT DOCUMENTS

WO    WO2012094197 A3    9/2013

OTHER PUBLICATIONS

'Buck-boost converter,' [online] [Retrieved on Apr. 30, 2013]; Retrieved from the Internet URL: http://en.wikipedia.org/wiki/Buck%E2%80%93boost_converter.
'Boost converter,' [online] [Retrieved on Apr. 30, 2013]; Retrieved from the Internet URL: http://en.wikipedia.org/wiki/Boost_converter.

* cited by examiner

*Primary Examiner* — Stephen W Jackson
(74) *Attorney, Agent, or Firm* — Fish & Richardson P.C.

(57) ABSTRACT

An electronic uninterruptible power supply unit includes one or more battery connections. A bi-directional converter is in electrical communication with the one or more battery connections and arranged to (a) provide power at a first controlled voltage from the one or more battery connections as a boost converter when power is determined to not be available from a power source; and (b) provide charge to the one or more battery connections by providing power at a second controlled voltage that is different from the first controlled voltage when power is determined to be available from the power source. First and second MOSFET switches are connected in series with the one or more battery connections and arranged as a bi-directional switch that controls charging current for the one or more battery connections.

22 Claims, 5 Drawing Sheets

BATTERY BACKUP WITH BI-DIRECTIONAL CONVERTER

TECHNICAL FIELD

This document relates to battery backup systems with bidirectional converters that regulate charging and discharging voltages of backup batteries.

BACKGROUND

An uninterruptible power supply (UPS) provides backup power to a load during loss of an input power source (typically termed a main power supply). UPS units typically include batteries that provide the backup power. During normal operation of a system that uses a UPS unit, an input power source provides power to the load and also charges the batteries of the UPS. During loss of input power, the batteries of the UPS provide power to the load. As a result, an uninterrupted supply of power can be provided to the load. Frequently, such a UPS may provide power for a sufficient time for the powered load to perform operations needed to power down smoothly, such as a computer finishing its current tasks and saving data from those tasks to permanent memory.

SUMMARY

The present disclosure describes systems and methods for regulating charging and discharging voltages and currents for batteries, such as UPS batteries. As described in more detail below, a UPS unit can include a bi-directional converter and a bi-directional switch. The bi-directional converter can be arranged as a boost converter when it provides power to a load. In addition, the bi-directional converter can be arranged as a buck converter when it charges the UPS batteries. The bi-directional switch can be arranged to regulate charging current for the UPS batteries and to isolate the UPS batteries in the event of a fault condition.

In certain examples described herein, an uninterruptible power supply unit includes one or more battery connections; a bi-directional converter in electrical communication with the one or more battery connections and arranged to (a) provide power at a first controlled voltage from the one or more battery connections as a boost converter when power is determined to not be available from a power source; and (b) provide charge to the one or more battery connections by providing power at a second controlled voltage that is different from the first controlled voltage when power is determined to be available from the power source; and first and second MOSFET switches connected in series with the one or more battery connections and arranged as a bi-directional switch that controls charging current for the one or more battery connections.

These and other embodiments can each optionally include one or more of the following features. In some aspects, the bi-directional converter includes third and fourth MOSFET switches arranged in series with each other, and at least one reactive element electrically coupled to the third and fourth MOSFET switches. An uninterruptible power supply unit can include a controller that is arranged to regulate the first controlled voltage and second controlled voltage by selectively switching the third and fourth MOSFET switches on and off in a manner complementary to each other and at a particular frequency. The controller can be arranged to adjust the first controlled voltage by adjusting an amount of time that the third MOSFET switch is on per cycle. The controller can be arranged to adjust the second controlled voltage by adjusting an amount of time that the fourth MOSFET switch is on per cycle.

In some aspects, the second MOSFET switch can be arranged to cause the bi-directional converter to provide power from the one or more battery connections when the second MOSFET switch is active. An uninterruptible power supply unit can include a controller that is arranged to cause the first MOSFET switch to operate in a linear region of a performance curve for the first MOSFET switch when charging one or more batteries by way of the battery connections.

In some aspects, the controller can be further arranged to control the charging current to the one or more battery connections by controlling a gate-to-source voltage of the first MOSFET switch while the first MOSFET switch is operating in the linear region. In some aspects, the controller can be further arranged to cause the second MOSFET switch to operate in a fully on mode during discharging to the one or more battery connections.

In some aspects, the controller can be arranged to switch the first and second MOSFET switches off in response to receiving feedback indicating an abnormal voltage or abnormal current at the one or more batteries. In some aspects, the first MOSFET switch includes an ORing FET. In some aspects, an uninterruptible power supply unit includes an ORing FET electrically coupled between the bi-directional converter and a power bus. In some aspects, the bi-directional converter can include the first MOSFET switch. One of the first MOSFET switch and the ORing FET can be arranged to operate in a linear region of a performance curve to control the charging current. In some aspects, the first MOSFET switch and the second MOSFET switch form a bi-directional switch.

In some aspects, an electronic uninterruptible power supply unit includes one or more battery connections; a bi-directional converter in electrical communication with the one or more battery connections and arranged to (a) provide power at a first controlled voltage from the one or more battery connections as a boost converter when power is determined to not be available from a power source; and (b) provide charge to the one or more battery connections by providing to the one or more battery connections power at a second controlled voltage that is different from the first controlled voltage when power is determined to be available from the power source; and a bi-directional switch connected in series with the one or more battery connections and arranged to (a) isolate the one or more battery connections from a power bus in response to a fault condition and (b) control charging current provided to the one or more battery connections.

In other aspects, the bi-directional switch includes two MOSFET switches connected in series with each other. An electronic uninterruptible power supply unit can include a controller arranged to control one of the two MOSFET switches in a linear mode of a performance curve for the one MOSFET switch to control the charging current.

In yet other aspects, a method for providing uninterruptible power includes receiving first data indicating power is sensed to be present at a power bus; in response to receiving the first data: charging one or more batteries of a uninterruptible power supply unit by providing power from the power bus to the one or more batteries; controlling a charging voltage of the power provided to the one or more batteries using a bi-directional converter that is arranged as a buck converter during charging of the one or more batteries and as a boost converter during discharging of the batteries; controlling a current of the power provided to the one or more batteries by operating a first MOSFET switch in the linear region of a performance curve for the first MOSFET switch, the first MOSFET being connected in series with a second MOSFET switch.

Aspects can further include receiving second data indicating that power is sensed to be absent from the power bus; in response to receiving the second data: discharging the one or more batteries to provide power to the power bus; controlling a voltage of the power provided to the power bus using the bi-directional converter; and controlling a current of the power provided to the power bus using the bi-directional converter.

In some aspects, controlling the voltage of the provided power can include controlling the voltage at a voltage level greater than that of a voltage level of the one or more batteries. Aspects can further include receiving third data indicating that the current of the power provided to the one or more batteries exceeds a threshold current level and in response to receiving the third data, causing the first and second MOSFET switches to operate in an off mode to isolate the one or more batteries from the power bus.

Aspects can further include receiving third data indicating that voltage of the power provided to the one or more batteries exceeds a threshold voltage level and in response to receiving the third data, causing the first and second MOSFET switches to operate in an off mode to isolate the one or more batteries from the power bus.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This description discusses uninterruptible power supply (UPS) units that include batteries and bi-directional converters for regulating charging and discharging voltages and currents of the batteries. In general, the UPS units can be used to provide a continuous supply of power to a load, such as a computer server system. During normal operation, the load may be powered by an input power source, such as normal line power provided by an electric utility. In addition, the input power source may be used to charge the batteries of the UPS unit when those batteries are not fully charged. If power from the input power source is lost, the batteries of the UPS unit may be discharged to power the load.

The bi-directional converter may be arranged to boost the battery voltage provided to the load during discharging and to reduce the voltage of the input power source (e.g., from a DC power bus) that is provided to the battery during charging. For example, the bi-directional converter may be arranged as a boost converter during discharging and as a buck converter during charging.

A UPS unit may also include a set of switches, such as a set of metal-oxide-semiconductor field-effect transistors (MOSFETS) (or multiple sets of switches). The set of switches can be used to control charging and discharging of the batteries. For example, the set of switches can be used as a protection component for the UPS unit's batteries by disconnecting the batteries from the input power source in response to a determination that battery voltages or currents are outside a predetermined range. The set of switches can also be used to regulate charging and discharging voltages and currents of the UPS unit's batteries.

The UPS may be sold and shipped separately from the batteries, and may later be connected to the batteries via one or more terminals or connectors. For example, batteries may be replaced regularly in a production environment, and old batteries may be disconnected from each particular UPS and new batteries may be connected.

Figure 1:
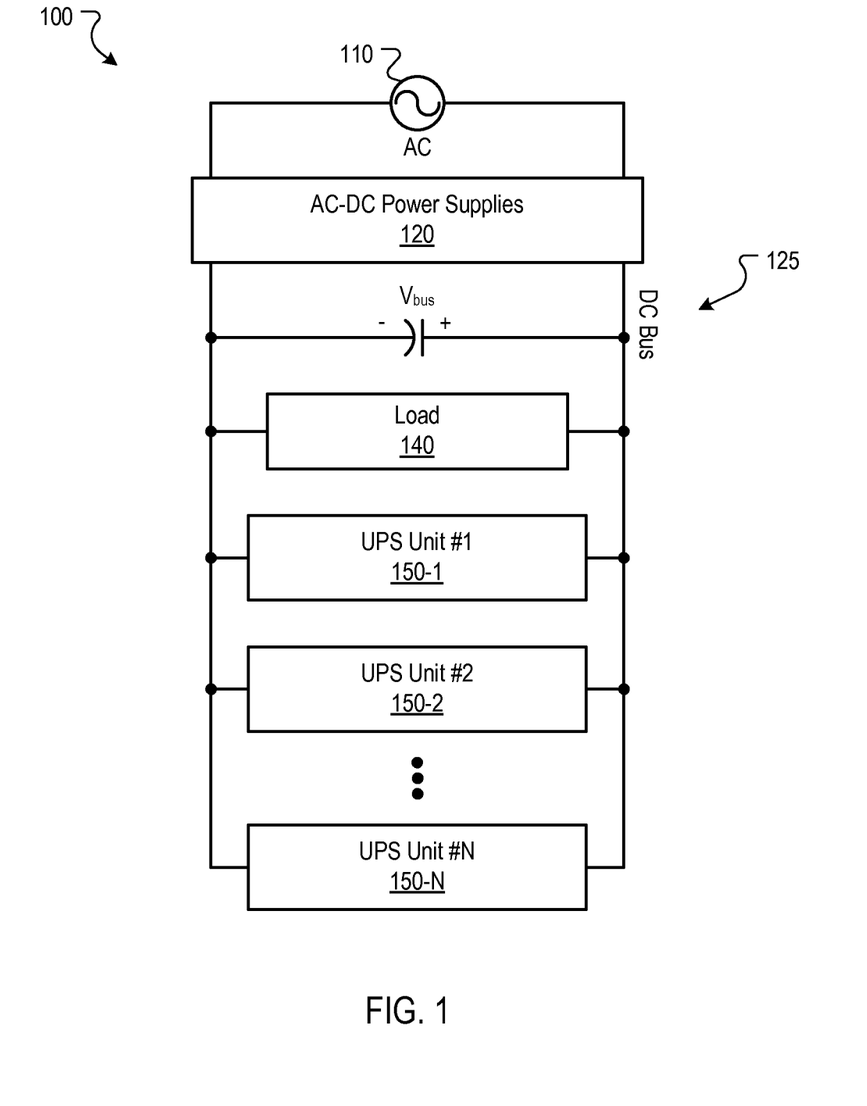
FIG. 1 is a schematic diagram of an example power architecture.

FIG. 1 is a schematic diagram of an example power architecture 100. The example power architecture includes an AC power source 110 and AC-DC power supplies 120. The AC-DC power supplies 120 convert AC power provided by the AC power source 110 to DC power and provide the DC power to a DC power bus 125. The AC-DC power supplies 120 may include, for example, one or more rectifiers.

A load 140 is electrically connected to the DC power bus 125. The load 140 may include, for example, computing components such as servers, racks of servers, networking equipment, data storage devices, or other computing components located at a data center. Also connected to the DC power bus 125 are one or more UPS units 150. As shown in FIG. 1, the UPS units 150 can be arranged on the DC power bus 125 in parallel with the AC-DC power supplies 120 and the load 140. The UPS units 150 are used to ensure continued power to the load, and thus continued operation of the load 140, in the event of a failure of the AC power source 110 and/or the AC-DC power supplies 120. For example, the UPS units 150 may provide power for a sufficient time for one or more servers to perform operations needed to power down smoothly in the event of AC power provided to a data center that houses the one or more servers.

During normal operation, the load 140 is powered using DC power provided to the DC power bus by the AC-DC power supplies 120. In the event that the AC-DC power supplies 120 fail to provide DC power to the DC power bus 125, for example due to the AC-DC power supplies 120 or the AC power source 110 failing, the UPS units 150 may power the load 140 by way of the DC power bus 125.

Thus, such a system may be implemented to provide power to one or more computer servers in a computer data center, or to other equipment, such as networking equipment. For example, during normal operation the computing equipment may be powered by AC utility power provided from a utility and converted to DC power by AC-DC power supplies. The AC-DC power supplies may be connected to a DC power bus that is also connected to the computer equipment. In the event that the utility power is lost, the AC-DC power supplies fail, or some other event causes the computer equipment to lose power, the UPS units may provide DC power the computer equipment by way of the DC power bus. For example, the UPS units may provide DC power to the computer equipment until the AC power is restored or until the computer equipment can be powered down smoothly.

Figure 2:
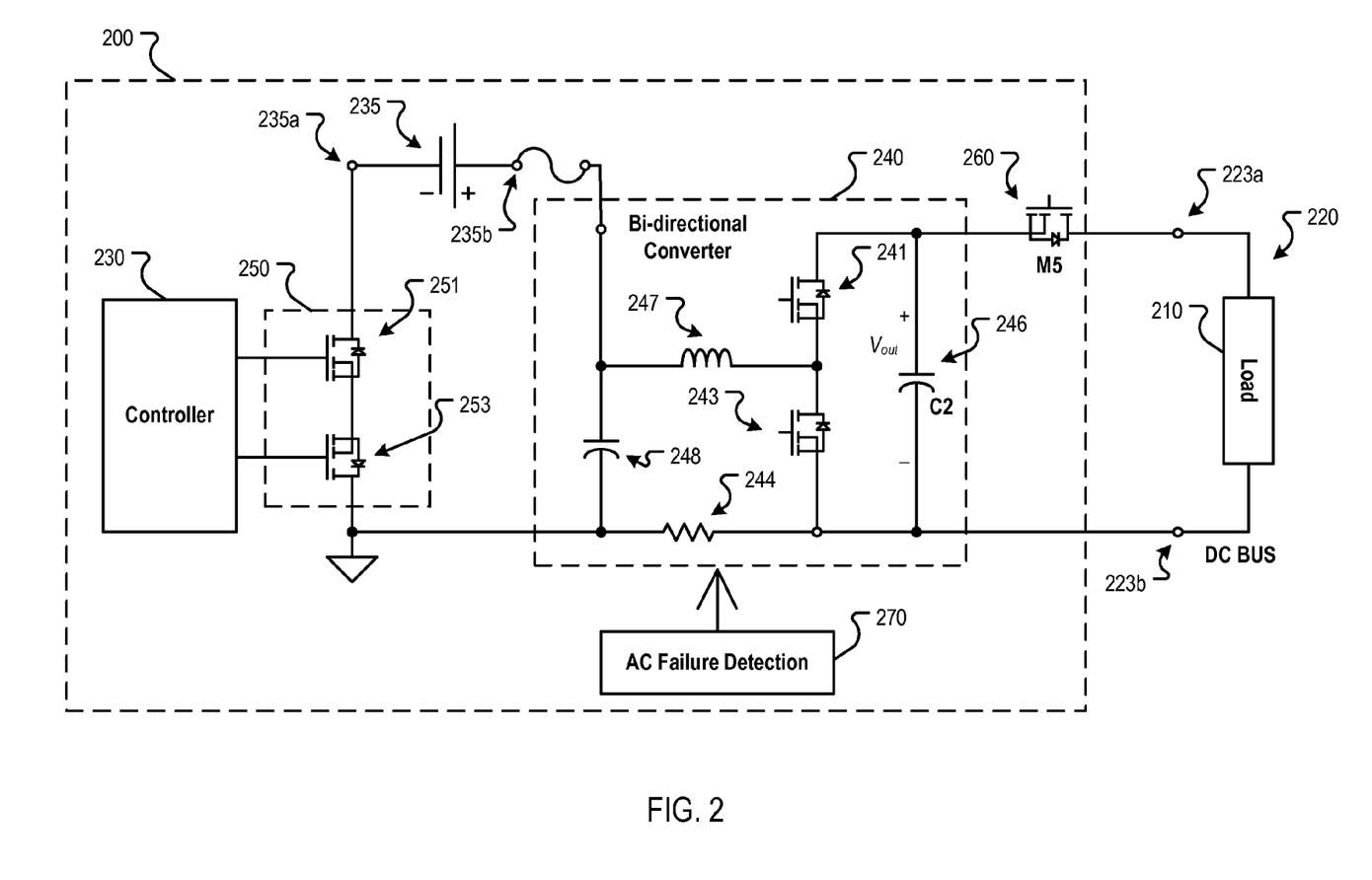
FIG. 2 is a schematic diagram of an example uninterruptible power supply unit.

FIG. 2 is a schematic diagram of an example UPS unit 200 that is connected to a load 210 by way of a DC power bus 220. The UPS unit 200 may, in certain implementations, correspond to particular ones of UPS units 150-1 to 150-N in FIG. 1. The DC power bus 220 can also be connected to one or more AC-DC power supplies (or another DC power source(s)) that provide DC power to the DC power bus 220 during normal operation. The UPS unit 200 is electrically coupled to the DC power bus 220 using terminals 223a and 223b.

The UPS unit 200 includes one or more batteries 235, a bi-directional converter 240, a set of switches 253 and 255, and a controller 230 (e.g., microcontroller) that controls operation of the switches 253 and 255. The one or more batteries 235 are connected between the set of switches and the bi-directional converter 240 by way of terminals 235a and 235b. The terminals 235a and 235b allow the one or more batteries 235 to be shipped separately from the UPS unit 200 and replaced as appropriate.

The bi-directional converter 240 can convert DC power in two directions. During normal operation when the load 210 is powered by an input power source (e.g., AC-DC power supplies), the bi-directional converter 240 provides DC power from the DC power bus 220 to the battery 235 to charge the battery 235. When input power is lost, the bi-directional converter 240 can convert DC power output by the battery 235 to power the load 210.

During charging of the battery 235, the bi-directional converter 240 regulates the charging voltage for the battery 235 (e.g., the voltage on capacitor 248). In the example arrangement illustrated in FIG. 2, the bi-directional converter 240 is arranged as a buck converter when converting power from the DC power bus 220 to DC power suitable for charging the batteries. In a buck converter arrangement, the bi-directional converter 240 converts the DC power from the DC bus 220 to a lower voltage level to charge the battery 235. That is, the bi-directional converter 240 steps down the voltage from the DC power bus 220 to charge the battery 235.

During discharging of the battery 235, the bi-directional converter 240 regulates the voltage level and/or the current level of DC power provided from the battery 235 to the load 210 (e.g., UPS output voltage and current). In the example arrangement illustrated in FIG. 2, the bi-directional converter 240 is arranged as a boost converter when it converts power from the batteries 235 to DC power suitable for consumption by the load 210. In a boost converter arrangement, the bi-directional converter 230 converts the DC power from the battery 235 to a higher voltage level for consumption by the load 210. Thus, in the example implementation illustrated in FIG. 1, the battery may be charged using a lower voltage than the voltage that is provided to the load 210.

Without boost operation in the bi-directional converter 240, the voltage level of the battery 235 may decline as the battery 235 discharges to power the load 210. The bi-directional converter 240, arranged as a boost converter, can maintain a suitably high (or higher) voltage for the load 210 as the battery's voltage level declines. This regulated voltage can increase the efficiency of the load 210.

MOSFET switches have several modes of operation. For example a MOSFET switch has a "fully off" mode of operation and a "fully on" mode of operation. Another mode of operation for a MOSFET switch is a linear region mode of operation in which the MOSFET switch operates in a linear region of a performance curve for the MOSFET switch. In the linear region mode of operation, the drain-to-source voltage of the MOSFET switch can be regulated by adjusting the gate-to-source voltage. For example, the drain-to-source voltage can be decreased by increasing the gate-to-source voltage. Another mode of operation for a MOSFET is a pulse width modulation mode to control the amount of power delivered to a load or other device. MOSFET switches described herein can take a number of forms, such as a MOSFET, IGBT, or other appropriate form of a switch.

Referring again to FIG. 2, the bi-directional converter 240 includes two MOSFET switches 241 and 243 connected in series with each other, an inductor 247, the capacitor 248, and an output capacitor 246. The MOSFET switches 241 and 243 may be controlled by the controller 230 (or another controller) to regulate the charging and discharging voltages and/or currents of the battery 235. In some implementations, the controller 230 operates the MOSFET switches 241 and 243 in a complementary manner. That is, when the MOSFET switch 241 is turned on, the MOSFET switch 243 is turned off, and vice versa (e.g., via a computer controller that monitors and controls the operation of one or more switches).

During charging and discharging, the MOSFET switches 241 and 243 may be switched on and off at a high frequency (e.g., a frequency of about 10 KHz, 100 KHz, a frequency between those values, or some other frequency) to control the voltage level that is provided by the power supply. The duty cycle of the MOSFET switches 241 and 243 can be adjusted (e.g., by the controller 230) to change the charging and discharging voltages. During charging, to increase the charging voltage of the battery 235, the duty cycle of the switches can be adjusted such that the MOSFET switch 241 remains on longer per cycle. This adjustment allows the capacitor 248 to be charged to a higher voltage level per cycle, thus increasing the charging voltage for the battery 235. Conversely, reducing the amount of time that the MOSFET switch 241 is on per cycle reduces the charging voltage for the battery 235.

During discharging of the batteries, the amount of time that the switch 243 is on per cycle can be adjusted to adjust the discharge voltage output onto the DC power bus 220. For example, the amount of time that the switch 243 is on per cycle can be increased to increase the output voltage. This increase in duty cycle for the switch 243 allows the capacitor 246 to be charged to a higher voltage level each cycle, thus increasing the output voltage onto the DC power bus 220.

The bi-directional converter 240 also includes a resistor 244. In some implementations, the resistor 244 is a shunt resistor. The resistor 244 can be used to detect the current flowing through the inductor 247, which represents the charging and discharging current of the battery 235. Other current sensing devices can also be used to detect the charging and discharging current of the battery 235. A signal indicating this current can be provided to the controller 230 for use in controlling the charging and discharging current of the battery 235.

The MOSFET switches 251 and 253 are used to regulate charging and discharging current of the battery 235 and can act as a protection component for the battery 235. For example, the MOSFET switches 251 and 253 can disconnect the battery 235 from the DC power bus 220 in response to a fault condition. The fault condition can include, for example, an under/over voltage supplied to the battery 235, a voltage unbalance of the battery 135, and/or an under/over current supplied to the battery 235. The controller 230 can turn the MOSFET switches 251 and 253 off in response to receiving data indicating that a fault condition has occurred. In some implementations, as illustrated in FIG. 2, the MOSFET switches 251 and 253 are arranged to form a bi-directional switch 250.

The controller 230 can control the operation of the bi-directional converter 240 using the MOSFET switches 241 and 243. The controller 230 may receive data regarding the status of the DC power bus 220 and/or AC power source that is providing power to the DC power bus 220 by way of AC-DC power supplies, and may selectively operate the bi-directional converter 240 based on this data. For example, the UPS unit 200 (or another apparatus) may include an AC failure detection device 270 that detects the failure of the AC power source and provide data regarding whether the AC power source is providing power or has failed. The controller 230 may also receive data regarding the level of voltage present on the DC power bus 220. If this voltage level is less than a desired voltage level for the DC power bus 220, or if the AC power source has failed, the controller 230 may place the bi-directional converter 240 in a discharging mode to provide power to the load 210. If the voltage level of the DC power bus 220 is at or above the desired voltage level, or if the AC power source has not failed, the controller 230 may place the bi-directional converter in a charging mode to charge the battery 235.

To place the bi-directional converter 240 into a charging mode to charge the battery 235, the controller 230 may turn off (or on) the MOSFET switch 253 and operate the MOSFET switch 251 in the linear region. This allows the controller 230 to regulate the charging current for the battery 235 by controlling the current that flows through the MOSFET switch 251. For example, the controller 230 may receive a signal that indicates the amount of charging current for the battery 235 from a current detection device. Based on the amount of current, the controller 230 may adjust the gate-to-source voltage of the MOSFET switch 251 to increase or decrease the charging current to a desired level. For example, the controller 230 may increase the gate-to-source voltage of the MOSFET switch 251 to increase the charging current to the desired level in response to determining that the charging current is less than the desired level.

Using the MOSFET switches 251 and 253 in this manner during battery charging, the charging current of the battery 235 can be controlled within a very small range. With the MOSFET switches 251 and 253, the inductor 247 may allow for greater swings in the voltage across the capacitor 248.

To place the bi-directional converter 240 into a discharging mode, the controller 230 may turn both MOSFET switches 251 and 253 fully on. During discharging, the bi-directional converter 240 can regulate the discharging current of the battery 235 and the voltage of the DC power bus 220. Having both MOSFET switches 251 and 253 in the fully on mode of operation while the battery 235 is discharging can reduce conduction loss.

The UPS unit 200 can also include an optional ORing FET 260, which can be controlled by the controller 230. For example, an ORing FET 260 may be included in a UPS unit 200 that is connected in parallel with one or more other UPS units. The O-Ring FET 260 can be used to protect the UPS unit 200 and/or the other UPS units or other components connected to the DC power bus 220. If the UPS unit 200 fails, the controller 230 can turn the ORing FET 260 off to isolate the UPS unit 200 from the DC power bus 220. For example, the failure of MOSFET switch 241 or 243 can cause a short circuit condition that may cause a short circuit current to flow to the output capacitor 246. In response, the controller 230 may receive a signal (e.g., from a voltage and current detector arranged to measure the voltage and current level of the DC power bus 220) indicative of the failure and turn off the ORing FET 260. The controller 230 can also turn off the ORing FET 260 in response to receiving a signal indicative of a failure of another component connected to the DC power bus 220.

In one example of the operation of the UPS unit 200, DC power may be initially received at the DC power bus 220 from AC-DC power supplies. In such a situation, the DC power on the DC power bus 220 may provide power to the load 210. In addition, the bi-directional converter 240 may charge the one or more batteries 235 using the DC power of the DC power bus 220. During charging, the controller 230 may close the MOSFET switch 253 and operate the MOSFET switch 251 in the linear region to regulate the charging current for the one or more batteries 235. The resistor 244 can be used to sense the charging current and the controller 230 can control the gate-to-source voltage of the MOSFET switch 251 based on the sensed charging current to regulate the charging current. In addition, the bi-directional converter 240, acting as a buck converter, may regulate the charging voltage for the one or more batteries 235. The controller 230 may also interact with the bi-directional converter 240 to adjust the charging voltage across the capacitor 248, for example, by adjusting the duty cycle of the MOSFET switches 241 and 243.

At a later time, power may be lost, for example, because of a problem with an electric utility supplying power to a data center that houses the load 210. In such a situation, the voltage of the DC power bus 220 would fall to a particular level (e.g., close to zero), which could be sensed by the AC failure detection 270. The AC failure detection 270 would then provide data indicating an under voltage condition or AC failure, or that a fault has occurred, to the controller 230. In turn, the controller 230 can open both MOSFET switches 251 and 253 so that the one or more batteries 235 can discharge to the bi-directional converter 240. The bi-directional converter 240, acting as a boost converter, can increase and regulate the voltage received from the one or more batteries 235 and provide the regulated voltage to the DC power bus 220. The controller 230 can adjust the voltage output by the bi-directional converter 240 by adjusting the duty cycle of the MOSFET switches 241 and 243.

During charging and discharging of the one or more batteries 235, the controller 230 can close the ORing FET 260 to allow current to flow between the UPS unit 200 and the DC power bus 220. In such a situation, the controller 230 may receive data from the AC power failure detection 270 indicating the failure. In turn, the controller 230 may open the ORing FET 260 to isolate the UPS unit 200 to prevent current from flowing from the DC power bus 220 to the UPS unit 200. In response to receiving data indicating that the fault condition has cleared, the controller 230 may close the ORing FET 260 and allow current to flow between the UPS unit 200 and the DC power bus 220.

At yet another time, the controller 230 may receive data indicating that the charging or discharging voltage or current is abnormally high. In such a situation, the controller 230 may open the MOSFET switches 251 and 253 to protect the one or more batteries 235. After the fault condition clears, the controller 230 can operate the MOSFET switches 251 and 253 in an appropriate manner to charge or discharge the one or more batteries 235.

Figure 3:
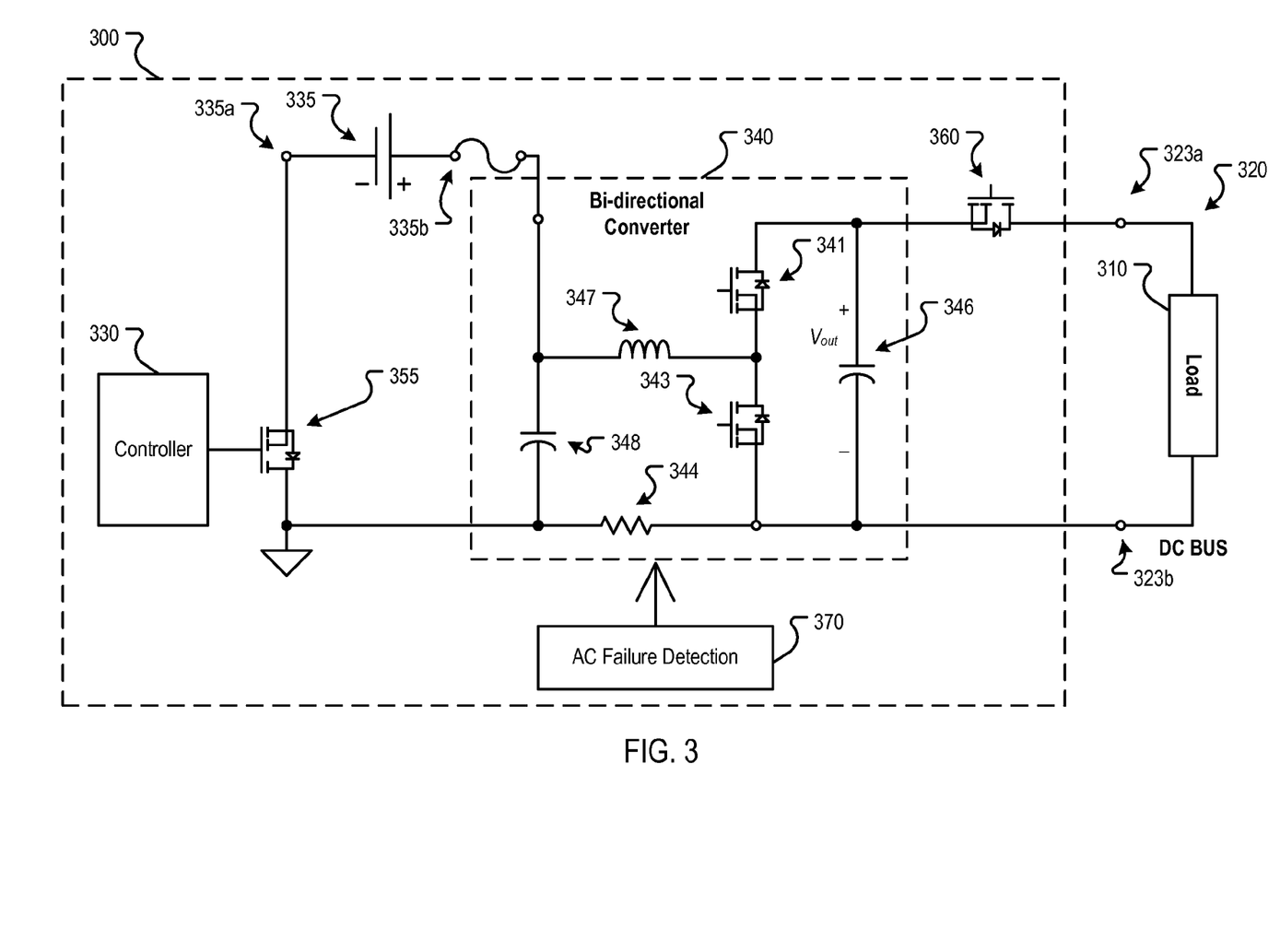
FIG. 3 is a schematic diagram of another example uninterruptible power supply unit.

FIG. 3 is a schematic diagram of another example UPS unit 300 that is connected to a load 310 by way of a DC power bus 320. The example UPS unit 300 includes components that are the same as, or similar to those of the UPS unit 200. For example, the UPS unit 300 includes a battery 335, battery terminals 335a and 335b, a controller 330, a bi-directional converter 340, and optional AC failure detection 370, which can be the same as, or similar to, the battery 235, the battery terminals 235a and 235b, the controller 230, the bi-directional converter 240, and the optional AC failure detection 270, respectively, of the UPS unit 200 illustrated in FIG. 2 and described above. The UPS unit 300 is connected to the DC power bus 320 by way of terminals 323a and 323b.

The bi-directional converter 340 may include the same or similar components as the bi-directional converter 240. For example, the bi-directional converter 340 includes MOSFET switches 341 and 343 connected in series with each other, a resistor 344 (e.g., shunt resistor), an inductor 347, a capacitor 348, and an output capacitor 346, each arranged the same as their corresponding components of the bi-directional converter 240. The bi-directional converter 340 can regulate the charging voltages and currents of the battery 335 and discharging voltages and currents of the battery 335 (e.g., UPS output voltages and currents at terminal 323a). For example, during discharging of the battery 335, the bi-directional converter 340 is arranged as a boost converter that boosts the voltage level of the battery 335 to a level suitable for the load 310.

The UPS unit 300 also includes a MOSFET switch 355 and an ORing FET 360, in place of the MOSFET switches 251 and 253 and the ORing FET 260 of FIG. 2. This arrangement allows the bi-directional converter 340 to perform similar charging and discharging functions as the UPS unit 200 with one less MOSFET switch. The ORing FET 360 can serve as protection for the UPS unit 300 and also regulate the charging current of the battery 335. For example, the controller 330 can turn the ORing FET 260 off to isolate the UPS unit 300 from the DC power bus 320 in response to receiving a signal that indicates a failure of the UPS unit 300 (e.g., failure of MOSFET switch 341 or 343) or another component connected to the DC power bus 220.

The ORing FET 360 (or the MOSFET switch 341) and the MOSFET switch 355 can regulate charging and discharging current of the battery 335, similar to that of the MOSFET switch 251 of the UPS unit 200. As illustrated in FIG. 3, the ORing FET 260 and the MOSFET 355 are connected in series with one another and in series with the battery 335. During charging, the controller may turn the MOSFET switch 355 on (even though it can be off) and regulate the charging current by controlling the amount of current flowing through the ORing FET 360 (or the MOSFET switch 341). For example, the controller 335 may control the current flowing through the ORing FET 360 (or the battery 335) by adjusting the gate-to-source voltage of one of the MOSFETs (e.g., either ORing FET 360 or MOSFET switch 341) while the MOSFET is operating in its linear region based on a signal that indicates the amount of current flowing through the ORing FET 360. This current measurement may be made by a current detection device, for example, that is connected at shunt resistor 344. When the ORing FET 360 is used to regulate the charging current, the MOSFET switch 341 may be turned on. Similarly, when the MOSFET switch 341 is used to regulate the charging current, the ORing FET 360 may be turned on. Regardless of which MOSFET is used to regulate the charging current, the MOSFET switch 343 may be turned off during charging.

During discharging of the battery 335, the ORing FET 360 and the MOSFET switch 355 may both be turned on by a controller (e.g., controller 330). In this arrangement, the bi-directional converter 340 may regulate the discharging current provided to the load 310. In some implementations, the MOSFET switch 355 may be used to disconnect the current path, similar to the MOSFET switch 255 of FIG. 2.

The MOSFET switch 355 may also be used as a protection device for the battery 335. For example, the controller 330 may turn off the MOSFET switch 355 to isolate the battery 335 from the DC power bus 320 in response to an under/over voltage supplied to the battery 335, a voltage unbalance of the battery 335, and/or an under/over current supplied to the battery 335. The ORing FET 360 may also be turned off in response to these fault conditions.

Figure 4:
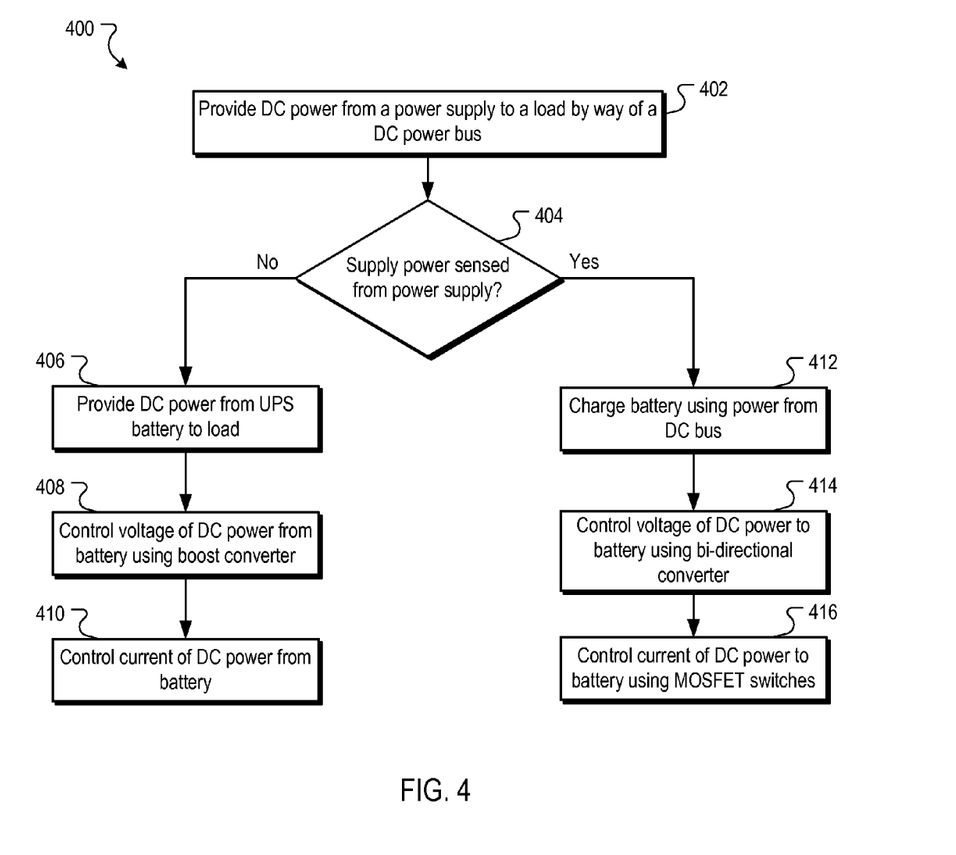
FIG. 4 is a flow chart of an example process for charging and discharging batteries of an uninterruptible power supply.

FIG. 4 is a flow chart of an example process 400 for charging and discharging batteries of an uninterruptible power supply. In general, the process 400 involves charging a UPS unit's battery during normal operation of a power supply system and discharging the battery to power a load when power from the power supply is lost. During charging and discharging, components of a UPS unit may regulate charging and discharging voltages and currents of the UPS unit. The process 400 can be performed using the UPS units 200 and 300 illustrated in FIGS. 2 and 3, respectively, and described above. For ease of description, the process 400 will be described with reference to FIG. 2.

DC power is provided from a power supply to a load 210 by way of a DC power bus 220 (402). For example, an AC-DC power supply may convert input AC power to DC power and provide the DC power to the DC power bus 220. The load 210 can be powered by the DC power of the DC power bus 220.

A determination is made whether supply power is sensed from the power supply (404). For example, a controller 230 may receive a signal that indicates the voltage level of the DC power bus 220. The controller 230 can determine whether supply power is present on the DC power bus 220 based on the signal. For example, if the voltage level is below a threshold, then the controller 230 may determine that supply power has been lost. By way of another example, a failure detection component 270 may monitor the DC power bus for loss of power and provide a signal to the controller 230 in the event of a loss of power.

If power is not sensed from the power supply, DC power can be provided from a UPS unit 200 to power the load 210 (406). In this way, the load 210 can be continuously powered in the event of loss of primary power from the power supply. To provide power to the load 210, the UPS unit 200 may discharge its battery 235 onto the DC power bus 220.

The voltage provided to the DC power bus 220 during discharging is controlled (408). For example, the UPS unit 200 includes a bi-directional converter 240 that can regulate the voltage level of the DC power provided to the DC power bus 220. During discharging, the bi-directional converter 240 is arranged as a boost converter that steps up the voltage of the battery 235 to a level suitable for the load 210. The controller 230 may control the switching of the MOSFET switches 241 and 243 to control the voltage level output by the UPS unit 200 onto the DC power bus 220. For example, if the controller 230 determines that the voltage level should be increased (e.g., due to the voltage level of the DC bus 220 being less than a desired voltage level), the controller 230 may increase the amount of time that the MOSFET switch 243 is turned on per cycle of the MOSFET switches 241 and 243. Conversely, if the controller 230 determines that the voltage level should be reduced, the controller 230 may reduce the amount of time that the MOSFET switch 243 is turned on per cycle of the MOSFET switches 241 and 243.

The discharging current of the battery 235 is controlled (410). The discharging current may be controlled by the bi-directional converter 240 by controlling the output voltage provided to the DC power bus 220. The MOSFET switches 251 and 253 may both be turned on to allow current to flow from the battery 235 to the DC power bus 220. If the current should be controlled within a narrow band, the discharging current may be controlled using the bi-directional converter 240. For example, the controller 230 may operate the MOSFET switches 241 or 243 in a pulse width modulation mode to control the amount of current flowing through the MOSFET switch 255, and thus to the DC power bus 220.

If it is determined that supply power is available from the primary power source (e.g., AC-DC power supplies), the battery 235 of the UPS unit 200 may be charged using the DC power of the DC power bus 220 (412). Concurrently, the load 210 may be powered by DC power from the DC power bus 220.

The charging voltage provided to the battery 235 is controlled (414). For example, the bi-directional converter 240 may control the charging voltage. As the voltage level of the DC power bus 220 may be higher than the voltage level appropriate for charging the battery 235, the bi-directional converter 240 may be arranged as a buck converter to reduce the voltage level for the battery 235.

The controller 230 may control the switching of the MOSFET switches 241 and 243 to control the voltage level provided to the battery 235. For example, if the controller 230 determines that the voltage level should be increased, the controller 230 may increase the amount of time that the MOSFET switch 241 is turned on per cycle of the MOSFET switches 241 and 243. Conversely, if the controller 230 determines that the voltage level should be reduced, the controller 230 may reduce the amount of time that the MOSFET switch 241 is turned on per cycle of the MOSFET switches 241 and 243.

The charging current provided to the battery 235 is controlled (416). The charging current may be controlled using the MOSFET switches 251 and 253. For example, the MOSFET switch 253 may be turned off, which allows current to flow through the internal diode of the MOSFET switch 253. The MOSFET switch 251 may be controlled in the linear region to control the amount of current flowing through the MOSFET switch 251 and thus, to the battery 235. The controller 230 may control the current flowing through the MOSFET switch 251 by adjusting the gate-to-source voltage of the MOSFET switch 251.

Figure 5:
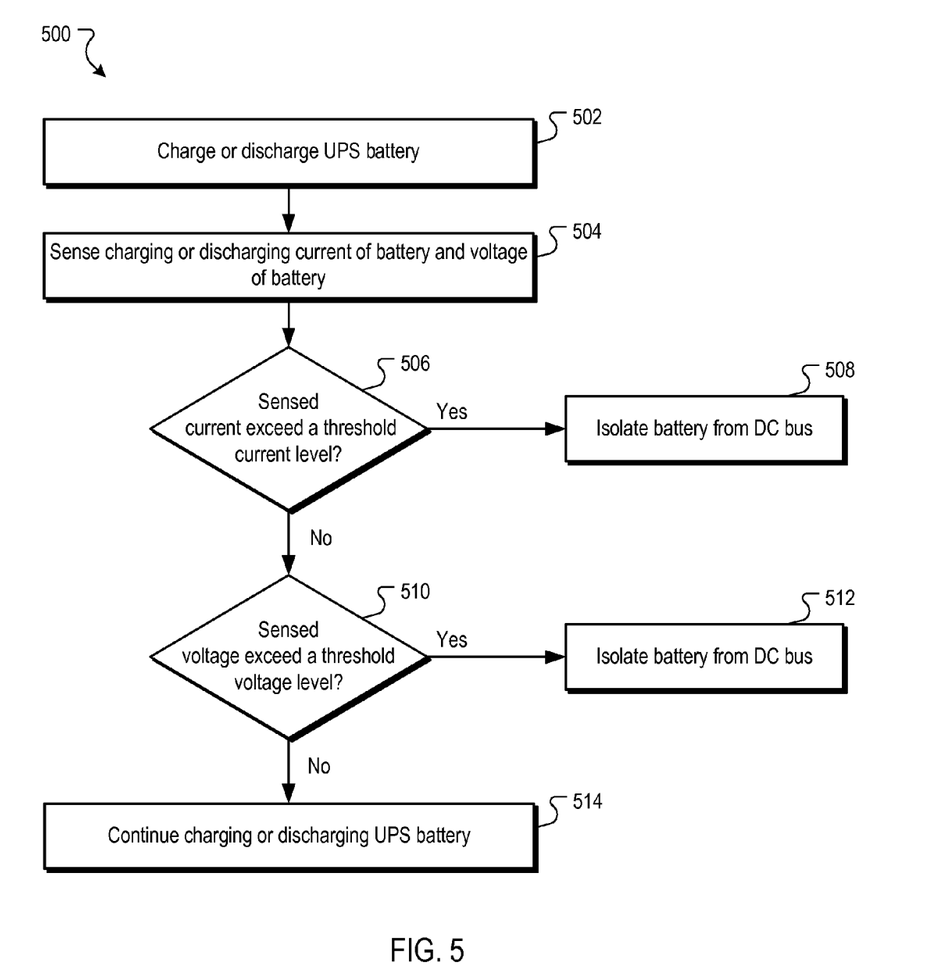
FIG. 5 is a flow chart of an example process for charging and discharging batteries of an uninterruptible power supply.

FIG. 5 is a flow chart of an example process 500 for charging and discharging a battery of a UPS unit. In general, the process 500 involves monitoring the voltage and current of the battery while the battery is charging and discharging. If the voltage or current is abnormal, e.g., higher than a threshold, the battery may be isolated from the DC power bus to which the UPS unit is connected. One or more MOSFET switches can be used to isolate the battery from the DC power bus. The process 400 can be performed using the UPS units 200 and 300 illustrated in FIGS. 2 and 3, respectively, and described above. For ease of description, the process 500 will be described with reference to FIG. 2.

The battery 235 of the UPS unit 200 is charged or discharged (502). For example, during normal operation of a power supply powering a load 210, the battery 235 may be charged by the power supply. If the power supply fails, the batter 235 may be discharged to power the load 210.

The voltage and current of the battery 235 is sensed or otherwise detected (504). For example, a voltage sensor may detect the voltage across the battery 235. A current sensor may detect the current flowing through resistor 244.

A determination is made whether the sensed current level exceeds a threshold current level (506). For example, the controller 230 may receive data specifying the sensed current level and compare the current level to the threshold current level. If the sensed current level exceeds the threshold current level, the controller 235 may isolate the battery 235 from the DC power bus 220 (508). For example, the controller 235 may turn off MOSFET switches 253 and 255 to isolate the battery 235 from the DC power bus 220. The controller 235 may also turn off the ORing FET 260 to isolate the battery 235 and the bi-directional converter 240 from the DC power bus 220.

If the sensed current level does not exceed the threshold current level, a determination is made whether the sensed voltage level exceeds a threshold voltage level (510). For example, the controller 235 may receive data specifying the sensed voltage level and compare the sensed voltage level to the threshold voltage level. If the sensed voltage level exceeds the threshold voltage level, the controller 235 may isolate the battery 235 from the DC power bus 220. For example, the controller 235 may turn off MOSFET switches 251 and 253 to isolate the battery 235 from the DC power bus 220. The controller 235 may also turn off the ORing FET 260 to isolate the battery 235 and the bi-directional converter 240 from the DC power bus 220. If the sensed voltage level does not exceed the threshold voltage level, the charging or discharging of the battery 235 continues (514).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Many other implementations other than those described may be employed, and may be encompassed by the following claims.

What is claimed is:

1. An electronic uninterruptible power supply unit, comprising:
   one or more battery connections;

a bi-directional converter in electrical communication with the one or more battery connections and arranged to (a) provide power at a first controlled voltage from the one or more battery connections as a boost converter when power is determined to not be available from a power source; and (b) provide charge to the one or more battery connections by providing power at a second controlled voltage that is different from the first controlled voltage when power is determined to be available from the power source, wherein the bi-directional converter comprises first and second solid state switches arranged in series with each other, and at least one reactive element electrically coupled to the first and second solid state switches; and third and fourth solid state switches connected in series with the one or more battery connections and arranged as a bi-directional switch that controls charging current for the one or more battery connections.

2. The electronic uninterruptible power supply unit of claim 1, further comprising a controller that is arranged to regulate the first controlled voltage and second controlled voltage by selectively switching the third and fourth MOSFET first and second solid state switches on and off in a manner complementary to each other and at a particular frequency.

3. The electronic uninterruptible power supply unit of claim 2, wherein the controller is arranged to adjust the first controlled voltage by adjusting an amount of time that the first solid state switch is on per cycle, and wherein the controller is arranged to adjust the second controlled voltage by adjusting an amount of time that the second solid state switch is on per cycle.

4. The electronic uninterruptible power supply unit of claim 1, wherein the fourth solid state switch is arranged to cause the bi-directional converter to provide power from the one or more battery connections when the fourth solid state switch is active.

5. An electronic uninterruptible power supply unit, comprising:
one or more battery connections;
a bi-directional converter in electrical communication with the one or more battery connections and arranged to (a) provide power at a first controlled voltage from the one or more battery connections as a boost converter when power is determined to not be available from a power source; and (b) provide charge to the one or more battery connections by providing power at a second controlled voltage that is different from the first controlled voltage when power is determined to be available from the power source;
first and second solid state switches connected in series with the one or more battery connections and arranged as a bi-directional switch that controls charging current for the one or more battery connections; and
a controller that is arranged to cause the first solid state switch to operate in a linear region of a performance curve for the first solid state switch when charging one or more batteries by way of the battery connections.

6. The electronic uninterruptible power supply unit of claim 5, wherein the controller is further arranged to control the charging current to the one or more battery connections by controlling a gate-to-source voltage of the first solid state switch while the first solid state switch is operating in the linear region.

7. The electronic uninterruptible power supply unit of claim 5, wherein the controller is further arranged to cause the second solid state switch to operate in a fully on mode during discharging to the one or more battery connections.

8. The electronic uninterruptible power supply unit of claim 5, wherein the controller is arranged to switch the first and second solid state switches off in response to receiving feedback indicating an abnormal voltage or abnormal current at the one or more batteries.

9. The electronic uninterruptible power supply unit of claim 1, wherein the third solid state switch comprises an ORing FET.

10. The electronic uninterruptible power supply unit of claim 1, further comprising an ORing FET electrically coupled between the bi-directional converter and a power bus.

11. The electronic uninterruptible power supply unit of claim 10, wherein the bi-directional converter comprises the third solid state switch and wherein one of the third solid state switch and the ORing FET is arranged to operate in a linear region of a performance curve to control the charging current.

12. The electronic uninterruptible power supply unit of claim 1, wherein the third solid state switch and the fourth solid state switch comprise a bi-directional switch.

13. An electronic uninterruptible power supply unit, comprising:
one or more battery connections;
a bi-directional converter in electrical communication with the one or more battery connections and arranged to (a) provide power at a first controlled voltage from the one or more battery connections as a boost converter when power is determined to not be available from a power source; and (b) provide charge to the one or more battery connections by providing to the one or more battery connections power at a second controlled voltage that is different from the first controlled voltage when power is determined to be available from the power source; and
a bi-directional switch connected in series with the one or more battery connections and arranged to (a) isolate the one or more battery connections from a power bus in response to a fault condition and (b) control charging current provided to the one or more battery connections.

14. The electronic uninterruptible power supply unit of claim 13, wherein the bi-directional switch comprises two solid state switches connected in series with each other.

15. The electronic uninterruptible power supply unit of claim 14, further comprising a controller arranged to control one of the two solid state switches in a linear mode of a performance curve for the one solid state switch to control the charging current.

16. A method for providing uninterruptible power, comprising:
receiving first data indicating power is sensed to be present at a power bus;
in response to receiving the first data:
charging one or more batteries of a uninterruptible power supply unit by providing power from the power bus to the one or more batteries;
controlling a charging voltage of the power provided to the one or more batteries using a bi-directional converter that is arranged as a buck converter during charging of the one or more batteries and as a boost converter during discharging of the batteries;
controlling a current of the power provided to the one or more batteries by operating a first solid state switch in the linear region of a performance curve for the first solid state switch, the first solid state switch being connected in series with a second solid state switch.

17. The method of claim 16, further comprising:
receiving second data indicating that power is sensed to be absent from the power bus;
in response to receiving the second data:
discharging the one or more batteries to provide power to the power bus;
controlling a voltage of the power provided to the power bus using the bi-directional converter; and
controlling a current of the power provided to the power bus using the bi-directional converter.

18. The method of claim 16, wherein controlling the voltage of the provided power comprises controlling the voltage at a voltage level greater than that of a voltage level of the one or more batteries.

19. The method of claim 16, further comprising:
receiving third data indicating that the current of the power provided to the one or more batteries exceeds a threshold current level; and
in response to receiving the third data, causing the first and second solid state switches to operate in an off mode to isolate the one or more batteries from the power bus.

20. The method of claim 16, further comprising:
receiving third data indicating that voltage of the power provided to the one or more batteries exceeds a threshold voltage level; and
in response to receiving the third data, causing the first and second solid state switches to operate in an off mode to isolate the one or more batteries from the power bus.

21. The electronic uninterruptible power supply unit of claim 1, wherein each of the first, second, third, and fourth solid state switches comprises a MOSFET switch.

22. The electronic uninterruptible power supply unit of claim 5, wherein each of the first and second solid state switches comprises a MOSFET switch.

* * * * *

UNITED STATES PATENT AND TRADEMARK OFFICE
CERTIFICATE OF CORRECTION

PATENT NO.       : 9,634,512 B1                                            Page 1 of 1
APPLICATION NO. : 14/095498
DATED            : April 25, 2017
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this
Twenty-fifth Day of September, 2018

Andrei Iancu
*Director of the United States Patent and Trademark Office*